UNITED STATES PATENT OFFICE.

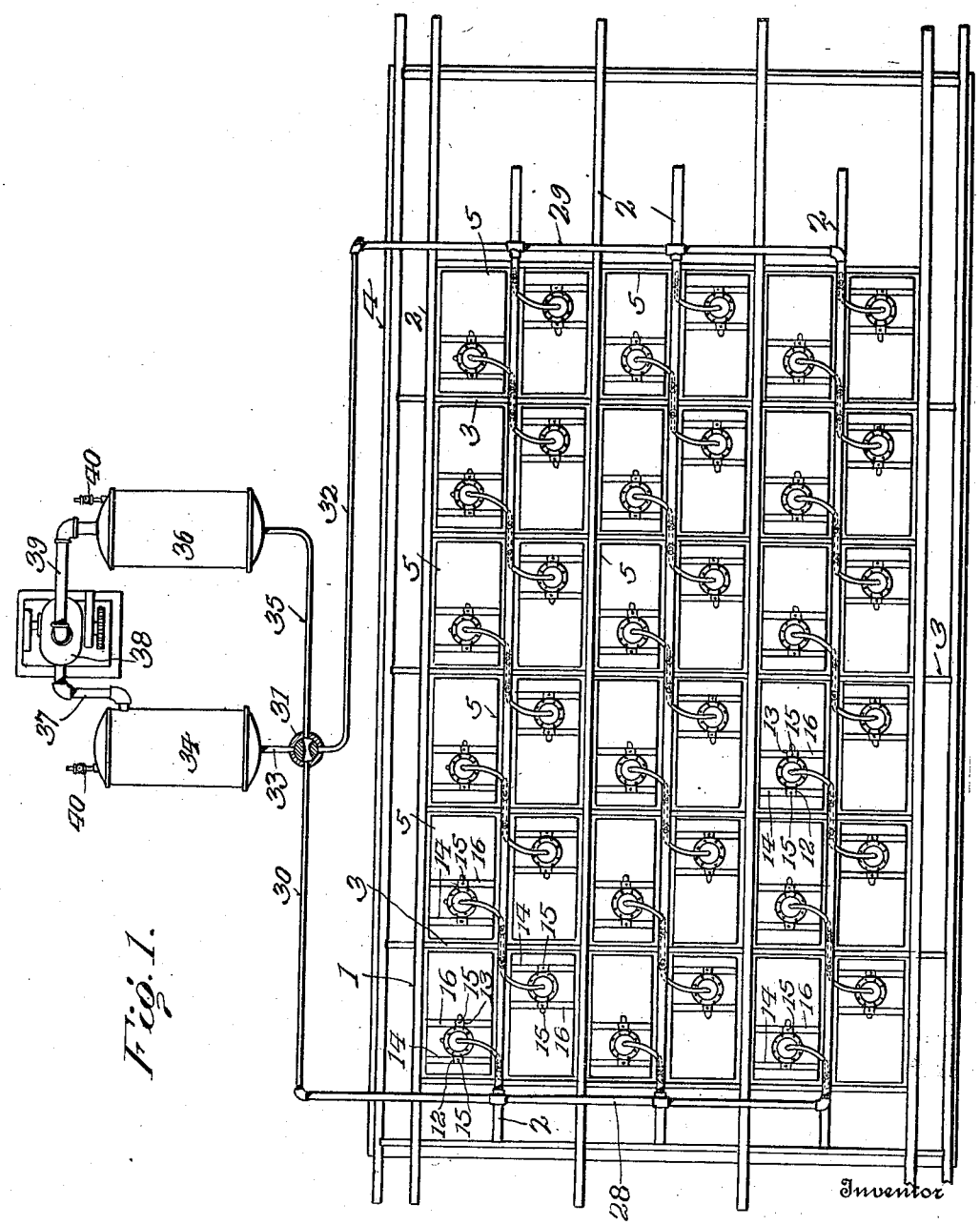

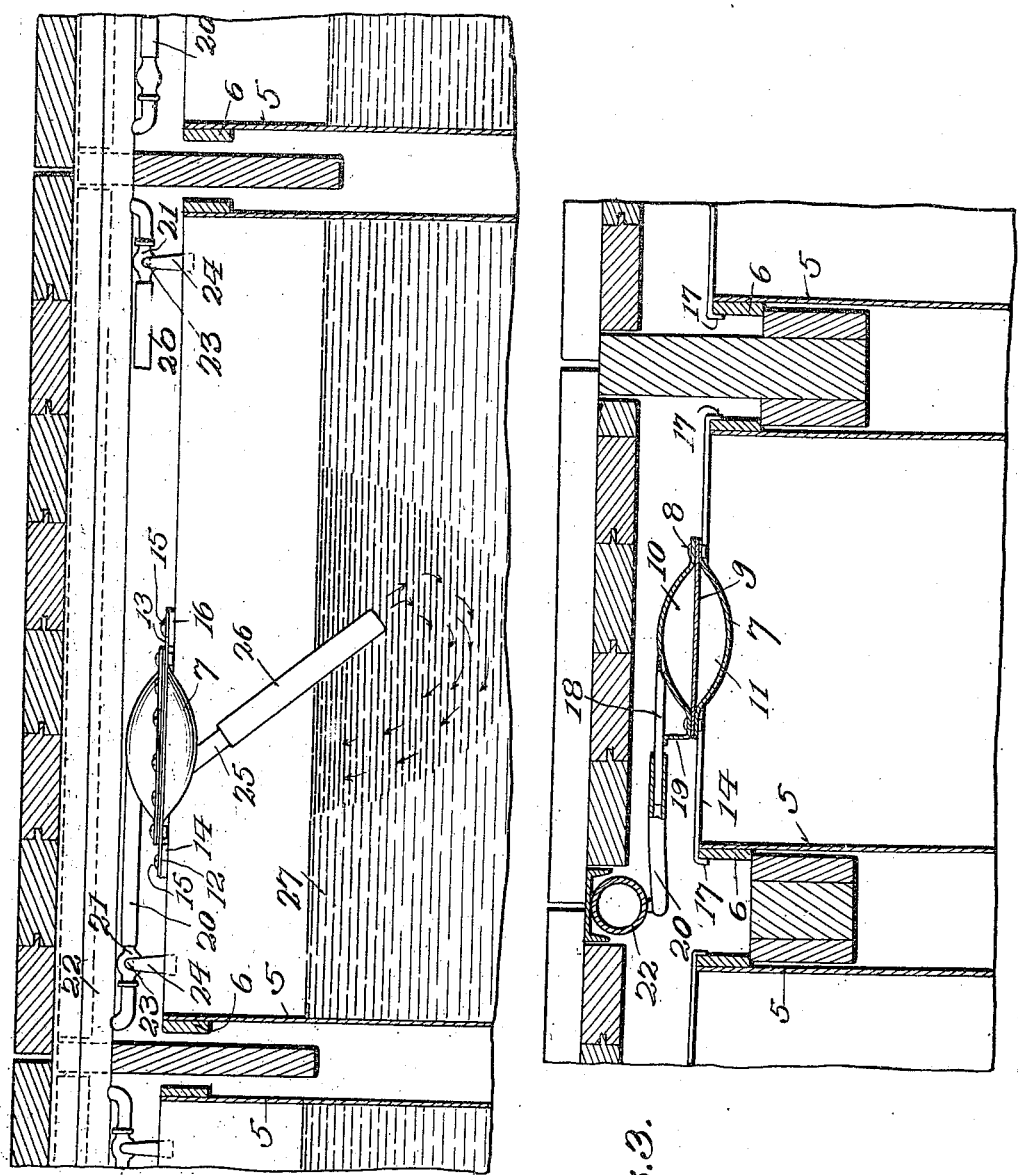

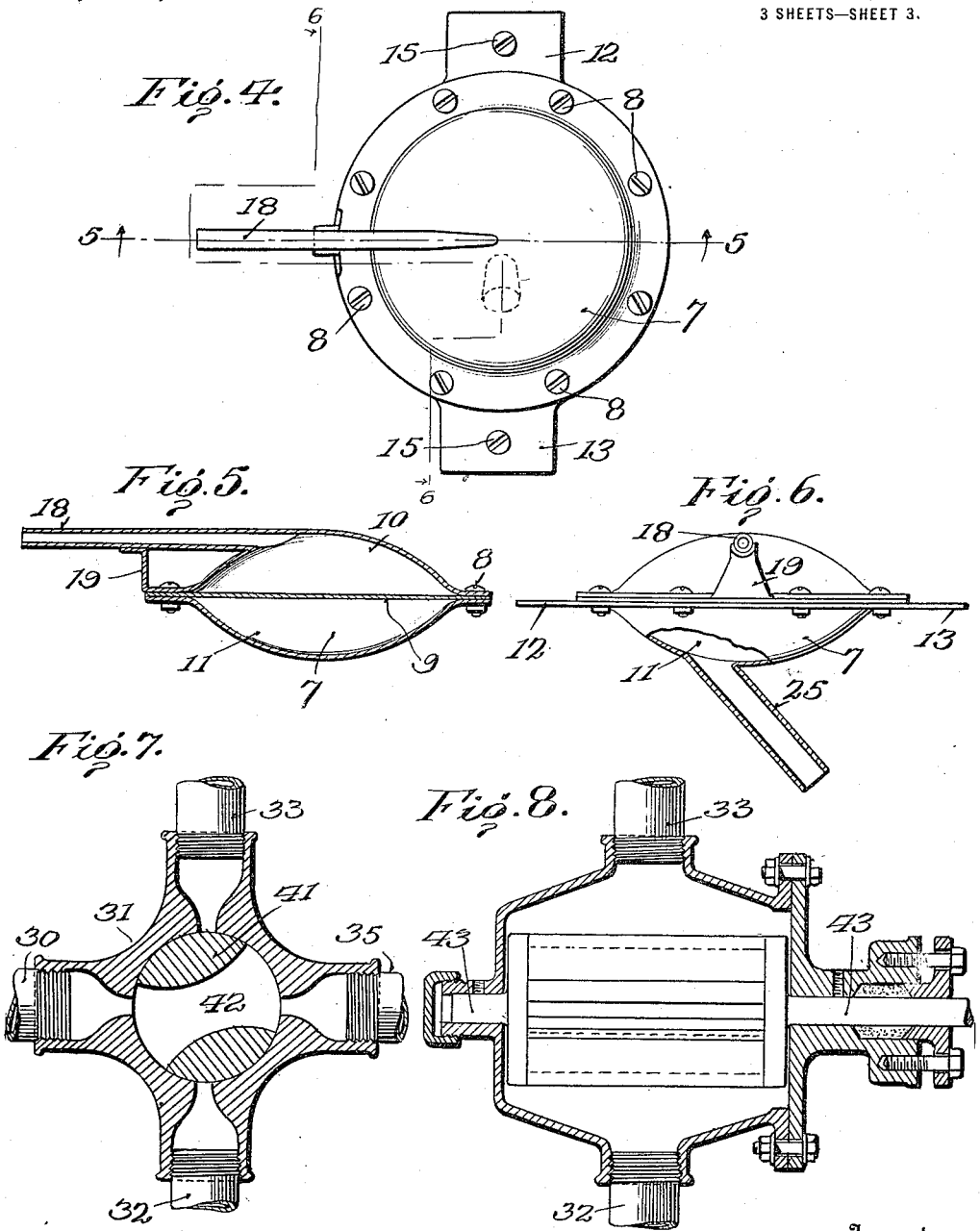

CASSIUS M. GAY, OF LOS ANGELES, CALIFORNIA; NORMAN H. GAY EXECUTOR OF SAID CASSIUS M. GAY, DECEASED.

ICE-MAKING APPARATUS.

1,273,055.  Specification of Letters Patent.  Patented July 16, 1918.

Application filed May 17, 1915. Serial No. 28,670.

*To all whom it may concern:*

Be it known that I, CASSIUS M. GAY, a citizen of the United States, residing at Los Angeles, in the county of Los Angeles, State of California, have invented certain new and useful Improvements in Ice-Making Apparatus, of which the following is a description, reference being had to the accompanying drawing, and to the figures of reference marked thereon.

The invention relates to new and useful improvements in an ice making apparatus and more particularly to devices for agitating the water in the containers during the process of freezing, so as to prevent air bubbles which cause the ice to have a snowy appearance.

An object of the invention is to provide an agitator for each water container which is self-contained, so that the entire agitating device for any one container may be readily removed without in any way disturbing the agitating devices for the other containers, or the operating mechanism therefor.

A further object of the invention is to provide a device of the above character which may be pneumatically operated.

A still further object of the invention is to provide an agitator, wherein a pulsating chamber is separated into two compartments by a diaphragm, which diaphragm is vibrated by varying the fluid pressure in the chamber at one side thereof, while the chamber at the other side thereof operates to draw in and expel a portion of the water in the container for agitating the same.

These and other objects will in part be obvious and will in part be hereinafter more fully disclosed.

In the drawings, which show by way of illustration one embodiment of the invention,—

Figure 1 is a view, showing more or less diagrammatically, an ice making apparatus having my improvements applied thereto;

Fig. 2 is an enlarged longitudinal sectional view through a portion of the tank;

Fig. 3 is a similar view transversely through the tank;

Fig. 4 is a plan view of one of the pulsators;

Fig. 5 is a sectional view on the line 5—5 of Fig. 4;

Fig. 6 is a view, partly in side elevation and partly in section, on the line 6—6 of Fig. 4;

Fig. 7 is a transverse sectional view of the rotating valve and the valve casing; and Fig. 8 is a longitudinal view through the valve casing.

My invention consists generally in an ice making apparatus comprising a main tank in which water containers are submerged in cold brine, which provides the freezing means for the raw water in the containers to be frozen. Associated with each container is a pulsator consisting of a casing having a detachable flexible connection with a pipe which in turn is connected to air tanks, one of which may be placed under vacuum and the other under pressure. This casing is divided by a flexible diaphragm into two chambers; one chamber is connected to the pipe, as above noted, while the other chamber is connected through a suitable tube to the water in the container, so that, as the diaphragm vibrates through varying the fluid pressures on one side of the diaphragm, the water will be sucked up by the other chamber or expelled therefrom and thus cause an agitation of the raw water in the tank which is to be frozen.

I have shown my improvements as applied to an ice making apparatus consisting of a main tank 1. This tank is divided longitudinally by beams 2 and transversely by beams 3, into compartments 4. In each compartment is a water container 5. The water container is preferably made of metal and is provided with cleats 6 adjacent the upper ends which rest on the cross beams for the purpose of supporting the containers. The tank is filled with brine in and about the containers, which serves as the medium for freezing the water in the containers. The tank above referred to may be of any desired construction or character and has been illustrated somewhat in detail purely for the purpose of illustrating the type of apparatus to which my improvements have been applied.

Each water container is provided with a pulsator or agitating device 7. This pulsator is preferably made of sheet metal and may be shaped as a segment of a sphere, as shown in the drawings, the two sections being joined by suitable clamping bolts 8. A flexible diaphragm 9 divides the pulsator into two chambers 10 and 11. This flexible diaphragm is clamped between the sections of the casing forming the pulsator. The pulsator has laterally projecting lugs 12 and 13. The lug 12 is secured to a cross bar 14 by a suitable screw 15, while the lug 13 is secured to a cross-bar 16, by a similar screw 15. These cross-bars 14 and 16 extend across the containers and rest on the side walls thereof, as clearly shown in the drawings. The edges of the cross-bars may be turned downwardly, as shown at 17, to prevent said cross bars from slipping off from the edges of the water containers. Formed integral with the upper section of the casing of the pulsator is a pipe 18. The casing of the pulsator may be bent upwardly to form a supporting bracket 19 for this pipe, if desired. The pipe 18 is connected by a flexible pipe 20 with an outlet nozzle 21, which in turn is connected with the main supply pipes 22. A valve 23 is located close to the nozzle and is controlled by a suitable handle 24. The other section of the casing of the pulsator is provided with a downwardly projecting pipe 25 which may be formed integral with the casing of the pulsator and a flexible pipe 26 connected to this pipe 25 extends downwardly below the surface of the water 27 in the container 5.

There are, of course, a series of pipes 22 and these are connected at one end to a header 28 and at their other ends to a header 29. The header 28 is connected by a pipe 30 to a valve chamber 31, while the header 29 is connected to a pipe 32, which in turn is connected to the valve chamber 31. The valve chamber 31 is connected by a pipe 33 with a closed tank 34. The valve chamber 31 is also connected by a pipe 35 with a closed tank 36. The tank 34, through a pipe 37, is connected to one side of a pump 38, while the tank 36 is connected to the other side of this pump through a pipe 39. The pump when operated places the tank 34 under vacuum and the tank 36 under pressure. Each tank may be provided with a relief valve 40, so as to maintain the vacuum or the air pressure within a predetermined range.

Within the valve casing 31, as clearly shown in Figs. 7 and 8, is a rotating valve 41. This rotating valve has a port 42 extending therethrough. Said valve is formed with suitable trunnions 43, one of which is extended and serves as a means for rotating the valve. The valve 41, as shown in Fig. 7, is in position for connecting the pipe 35 with the pipe 30 and this puts the pipe 30 under air pressure, which in turn will put the chamber 10 of each pulsator connected to said pipe under air pressure, which will force the diaphragm 9 downwardly, as viewed in Fig. 5. At this time the valve closes the connection of the pipe 33 with the valve casing. A rotation of the valve 41 will connect the pipe 33 with the pipe 32 and close the connection between the pipe 35 and the valve casing and when the pipe 33 is connected with the pipe 32 and each of the pipes 22 will be placed under vacuum and this will place the chamber above the flexible diaphragm and each pulsator under vacuum causing the diaphragm to move upwardly, thus sucking in water from each container into each pulsator. As the valve rotates the pipes 22 will be intermittently and alternately placed under pressure and then under vacuum and this will cause a vibration of the diaphragms 9, which in turn will cause a sucking up and expelling of the water from the containers. This sucking up and expelling of the water by the pulsator causes a circulation within a certain region of the upper portion of the water in each container. This agitating of the water in the container during the process of freezing prevents the incarceration of the air bubbles which causes the ice to have a snowy appearance and hence renders the ice less salable.

After the ice is frozen clear and the container is to be removed, the pulsator including the cross bars supporting the same are removed and also the flexible pipe connection with the pipes 22. The valves 23 are closed at this time which cuts off each pulsator from the operating pipe therefor. After the removal of the pulsator the container can be readily lifted from the tank. If any pulsator becomes defective in any way, it may be readily disconnected for repair and when one pulsator is removed or stopped this is done without in any way interfering with the action of the other pulsators.

It will thus be seen that I have provided an agitating device for the water in each container, which, in a sense, is self-contained, so that it may be readily disconnected from the pipe therefor or its action may be stopped without in any way affecting the action of the other pulsating devices. It will also be noted that my improved pulsators are pneumatically operated, which provides a very efficient actuating means for a large number of pulsators and also a very flexible operating means which can be readily adapted for tanks of varying sizes or proportions.

It is obvious that minor changes in the details of construction and arrangement of parts may be made without departing from the spirit of the invention as set forth in the appended claim.

Having thus described my invention, what I claim as new and desire to secure by Letters Patent, is:

An ice making apparatus including in combination, a tank, means for supporting a plurality of containers in said tank, means for freezing the water in said container, a plurality of pipes supported by said tank, means for placing said pipes alternately under pressure and under vacuum, a pulsator for each container, means for removably supporting the pulsator on the container, means for detachably connecting the pulsator to said pipes, said connecting means having a valve therein, each pulsator including a flexible diaphragm vibrated by the varying pressure in said pipes, and means whereby said vibrating diaphragm operates to agitate the water in the containers.

In testimony whereof, I affix my signature, in the presence of two witnesses.

CASSIUS M. GAY.

Witnesses:
HERBERT W. PACKARD,
NORMAN A. GAY.

Copies of this patent may be obtained for five cents each, by addressing the "Commissioner of Patents, Washington, D. C."